(12) United States Patent
Preston et al.

(10) Patent No.: US 6,771,629 B1
(45) Date of Patent: Aug. 3, 2004

(54) IN-BAND SIGNALING FOR SYNCHRONIZATION IN A VOICE COMMUNICATIONS NETWORK

(75) Inventors: Dan A. Preston, Bainbridge Island, WA (US); Joseph Preston, Bainbridge Island, WA (US); Rod L. Proctor, Seattle, WA (US)

(73) Assignee: Airbiquity Inc., Bainbridge Island, WA (US)

( * ) Notice: Subject to any disclaimer, the term of this patent is extended or adjusted under 35 U.S.C. 154(b) by 0 days.

(21) Appl. No.: 09/484,942

(22) Filed: Jan. 18, 2000

Related U.S. Application Data (60) Provisional application No. 60/116,093, filed on Jan. 15, 1999.

(51) Int. Cl.[7] .................................................. H04J 3/00
(52) U.S. Cl. ........................ 370/337; 370/350; 370/508
(58) Field of Search ................................ 370/324, 350, 370/503, 508, 516, 519, 252; 375/354, 356; 455/502, 67.6; 342/357.06, 357.08, 357.09, 357.12

(56) References Cited

U.S. PATENT DOCUMENTS

| | | | |
|---|---|---|---|
| 4,218,654 A | 8/1980 | Ogawa et al. ................. 370/97 |
| 4,310,722 A | 1/1982 | Schaible .................... 179/2 EB |
| 4,368,987 A | 1/1983 | Waters ........................ 368/46 |
| 4,494,211 A | 1/1985 | Schwartz ..................... 364/571 |
| 4,607,257 A | * | 8/1986 | Noguchi ................ 340/825.69 |
| 5,014,344 A | 5/1991 | Goldberg ..................... 455/51 |
| 5,245,634 A | 9/1993 | Averbuch .................... 375/108 |
| 5,509,035 A | 4/1996 | Teidemann, Jr. et al. ... 375/356 |
| 5,510,797 A | * | 4/1996 | Abraham et al. ........... 342/352 |
| 5,663,734 A | 9/1997 | Krasner ...................... 342/357 |
| 5,781,156 A | 7/1998 | Krasner ...................... 342/357 |
| 5,812,087 A | 9/1998 | Krasner ...................... 342/357 |

(List continued on next page.)

FOREIGN PATENT DOCUMENTS

| | | | |
|---|---|---|---|
| EP | 0896442 | 2/1999 | ............ H04B/7/26 |
| EP | 11109062 | 4/1999 | ........... G04C/11/00 |
| WO | WO 98/59257 | 12/1998 | ............. G01S/1/04 |
| WO | WO 99/36795 | 7/1999 | ............. G01S/5/14 |
| WO | WO 99/56143 | 11/1999 | ............. G01S/5/14 |
| WO | WO 99/56144 | 11/1999 | ............. G01S/5/14 |

OTHER PUBLICATIONS

Jain et al, Potential Networking Applications of Global Positioning Systems (GPS), downloadable at http://www.cis.ohio-state.edu/~jain/papers/gps.htm, pp. 1–40, Apr. 1996.*
International Search Report for International Application No. PCT/US01/19845, Nov. 22, 2001.
PCT International Search Report, dated May 23, 2000 for International Application No. PCT/US00/01157.

Primary Examiner—Frank Duong
(74) Attorney, Agent, or Firm—Stoel Rives LLP (57) ABSTRACT

Methods for determining a system latency of an audio call path of a voice communications network, and for synchronizing a remote unit (108) with a reference oscillator of a reference station (102) involve transmitting a reference signal (106) over the audio call path from the reference station (102) to the remote unit (108), where a reply signal (112) is generated and transmitted back to the reference station (102) over the call path after a preselected reply delay interval ($t_{del}$). A round-trip time difference ($t_{RT}$) is used to determine total system latency, which is then taken into account in synchronizing the remote unit (108) with the reference oscillator. The reference and reply signals (106, 112) are generated as audio-frequency signals resembling human voice sounds to avoid destructive attenuation by the voice communications network. One embodiment includes a wireless telephone unit having an on-board SPS receiver. The SPS receiver includes an oscillator that can be synchronized using the method to improve performance of the SPS receiver. Convenient and efficient methods of synchronization and location data reporting within existing wireless communication network infrastructures are disclosed.

33 Claims, 3 Drawing Sheets

U.S. PATENT DOCUMENTS

| | | | |
|---|---|---|---|
| 5,825,327 A | 10/1998 | Krasner | 342/357 |
| 5,831,574 A | 11/1998 | Krasner | 342/357 |
| 5,841,396 A | 11/1998 | Krasner | 342/357 |
| 5,874,914 A | 2/1999 | Krasner | 342/357 |
| 5,884,214 A | 3/1999 | Krasner | 701/207 |
| 5,912,886 A * | 6/1999 | Takahashi et al. | 370/350 |
| 5,917,449 A | 6/1999 | Sanderford et al. | 342/457 |
| 5,930,722 A | 7/1999 | Han et al. | 455/502 |
| 5,945,944 A | 8/1999 | Krasner | 342/357 |
| 5,999,124 A | 12/1999 | Sheynblat | 342/357 |
| 6,002,363 A | 12/1999 | Krasner | 342/357 |
| 6,031,489 A | 2/2000 | Wyrwas et al. | 342/357.16 |
| 6,144,336 A * | 11/2000 | Preston et al. | 342/357.09 |

* cited by examiner

IN-BAND SIGNALING FOR SYNCHRONIZATION IN A VOICE COMMUNICATIONS NETWORK

This application claims the benefit under 35 U.S.C. § 119(e) of U.S. Provisional Patent Application No. 60/116,093, filed Jan. 15, 1999.

TECHNICAL FIELD

This invention relates to methods of in-band signaling for measurement of system latency in wireless and wire line communications and, in particular, to the use of latency measurements for time synchronization and synchronization error measurement between a reference clock and a remote clock in communication over a wireless and/or wire line voice communication network.

BACKGROUND OF THE INVENTION

Numerous methods of signaling are known for accurately synchronizing a slave oscillator with a distant master oscillator. One such known method uses SPS signals that are transmitted from master oscillator-bearing earth satellites of a satellite positioning system (SPS) such as the Global Positioning System (GPS) or GLONASS. A slave oscillator is synchronized to a SPS master oscillator in a normal SPS signal receiving mode called "lock." In a mobile unit including an SPS positioning receiver, the amount of synchronization error between the SPS master oscillator and a slave oscillator of the SPS positioning receiver impacts the ability of the SPS positioning receiver to accurately determine its position from the SPS signals using satellite ephemeris data. For example, the synchronization error of a slave oscillator of a GPS receiver must be less than about +/−500 microseconds ($\mu$sec) from a GPS satellite master oscillator in order to obtain a location fix from a cold start in less than 30 seconds. In lock mode, the slave oscillator is typically synchronized to within +/−10 $\mu$sec of the GPS satellite master oscillator. When SPS signals are not available, for example because SPS satellites are out of view, or when the mobile unit has not acquired an SPS satellite signal, the mobile unit must be re-synchronized due to drift of the slave oscillator over time. Re-synchronization requires a significant amount of time if SPS signals must be used. SPS synchronization from a cold start is also time consuming. Synchronization processing times of up to one minute or more from cold start are not uncommon.

Other types of electronic equipment such as computer networking equipment, instruments, control systems, and ranging devices also rely upon accurately synchronized internal clocks. U.S. Pat. No. 5,510,797 of Abraham et al. describes the use of an SPS receiver in connection with computers and time-controlled instruments to synchronize their internal clocks.

U.S. Pat. No. 4,368,987 of Waters describes a synchronization method for satellites in which a master pulse is transmitted by a master-clock station to a slave station where a slave pulse having conjugate phase with respect to the received master pulse is retransmitted for receipt by the master station. A measurement at the master station of a time difference between the master pulse and the received slave pulse is used to calculate a time phase difference between the master clock and the slave clock. The time phase difference is then used to synchronize the clocks. Waters requires cooperation between the satellite-based master station and the satellite-based slave station in order to determine phase difference and for clock synchronization. Thus, the method described by Waters is not a substitute for re-synchronization of an SPS-enabled mobile unit. SPS satellites, which were originally developed for military use, will not retransmit a slave pulse in response to a master pulse received from the mobile unit. Nor will the SPS satellites, conversely, receive a conjugate slave pulse generated by the mobile unit or calculate a phase time difference.

For calls originating from wire line telephones, Automatic Number Identification (ANI) service allows a call receiving station, such as a Public Safety Answering Point (PSAP), to quickly lookup the name and address of the caller (registered telephone owner) in an owner database. The portable nature of wireless communications devices eliminates the viability of such a lookup scheme in wireless networks. Wireless mobile telephone units incorporating SPS receivers have been contemplated as a way to generate location data that can then be transmitted to a call receiving station. In theory, the generation and transmission of location data in this manner would be especially useful for locating a wireless caller that dials 911 to report an emergency, but who is unable to verbally provide location information to a PSAP operator.

While SPS-enabled wireless telephones may provide the capability to accurately determine and transmit location data, numerous practical realities present obstacles to the timely and efficient generation and transmission of location data to a call receiving station. For example, the SPS receiver of the SPS-enabled wireless telephone may need to synchronize to SPS time before it can generate useable location data. In an emergency situation involving a call to a PSAP, the amount of time required to synchronize the SPS receiver using SPS satellite signals can cost lives.

Figure 1:
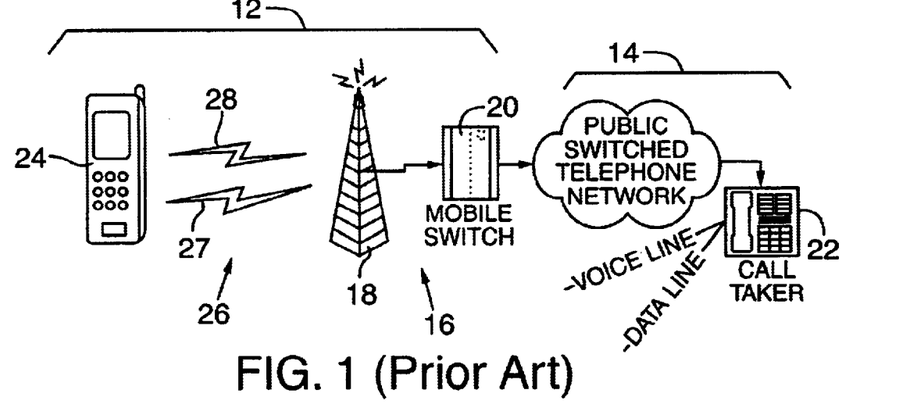
FIG. 1 is a diagram of a prior-art wireless communications network showing components of a wireless communications network and their connection to a wire line communications network.

FIG. 1 shows a diagram of a prior art voice communications network 10 including a wireless communications network 12 coupled to a wire line communications network (POTS network) 14. With reference to FIG. 1, wireless communications network 12 includes one or more cellular base stations 16 each having an associated base station antenna 18 and a mobile switching center 20. Mobile switching center 20 couples cellular base station 16 to POTS network 14 to allow a wire line call taker 22, such as a PSAP, to communicate with a mobile unit 24 of wireless communications network 12. In operation, mobile unit 24 transmits and receives signals that are respectively received and transmitted by cellular base station 16 over two transmission channels 26. These transmission channels 26 include a voice channel 27 (which is also known as the call path, the voice call path, the voice call connection, the audio call path, the audio traffic channel, and the traffic channel) for transmitting radio-frequency signals representative of voice, and a control channel 28 (also known as an overhead channel and the non-call path) for transmitting call initiation and control signals. In digital wireless communications networks, transmissions over control channel 28 consist of packetized digital data. Protocols for control channel 28 and the type of data that can be carried on control channel 28 are determined by the type of control channel communications protocol in use by wireless communications network. Because each type of wireless network uses its own protocol, control signals must be decoded at cellular base station 16.

Other inherent limitations of the prior art will become apparent upon a review of the following summary of the invention and detailed description of preferred embodiments.

SUMMARY OF THE INVENTION

Wireline and wireless communications systems have some system latency, typically less than 500 milliseconds (ms), due to propagation and processing of signals traveling in the call path. In wireless communications networks, differences in air interface protocols, base stations, handset manufacturers, and transmission distances make the system latency variable.

The present invention provides methods for determining a system latency of a voice communication network for signals transmitted between a reference station and a remote unit over an audio call path of the voice communications network. The system latency is then taken into account during synchronization of the remote unit with a reference oscillator of the reference station. Measurement of system latency is accomplished by a signaling sequence including transmitting a reference signal over the audio call path from the reference station to the remote unit, where a reply signal is generated and transmitted back to the reference station over the call path after a preselected reply delay interval. The reference signal and the reply signal are transmitted for respective predetermined reference and reply durations, which may be dictated by signal attenuation characteristics of the voice communications network. The reply delay interval begins upon receipt of the reference signal at the remote unit and must be preselected to allow sufficient time for the remote unit to process the reference signal and generate the reply signal. A measurement is made at the reference station to determine a round-trip time difference between transmission of the reference signal and receipt of the reply signal. A total latency is then calculated as the round-trip time difference less the sum of the reference duration, the reply duration, and the reply delay interval.

In another aspect of the present invention, a correction interval is calculated as one-half the total latency, and a synchronization signal representing the correction interval is then transmitted from the reference station over the call path for receipt by the remote unit. The remote unit synchronizes itself with the reference oscillator in response to the synchronization signal. Synchronization may be effectively accomplished in a number of different ways, for example, by storing the synchronization signal at the remote unit and using it later as a parameter for calculating synchronized time, or by adjustment or restarting of the remote oscillator upon receipt of a synchronization mark of the synchronization signal.

In a further aspect of the present invention, the remote unit is a mobile unit that includes an SPS receiver. In this aspect, the remote oscillator is coupled to or made part of the SPS receiver and is used by the SPS receiver, in conjunction with, SPS satellite signals to determine a location of the remote unit. Synchronization of the remote oscillator may be accomplished by any of the above-described synchronization techniques or by modification, in response to the synchronization signal, of algorithms used by the SPS receiver to calculate the location of the remote unit.

In yet another aspect of the present invention, the reference signal, the reply signal, and the synchronization signal are all audio-frequency signals that are adapted to freely pass through the voice communications network. Such audio-frequency signals are necessary for transmission over a voice call path of an advanced communications network of the type that uses compression protocols and/or spread-spectrum technology to maximize call traffic in a limited radio-frequency bandwidth. Examples of protocols used in advanced communications networks include time-division multiple access (TDMA), code-division multiple access (CDMA), global system for mobile communication (GSM), and others. The reference, reply, and synchronization signals also transmit freely through analog wireless networks. These audio-frequency signals are specifically configured to emulate certain characteristics of the human voice such as, for example, frequency, amplitude, and duration. By generating signals that resemble sounds of the human voice, the present invention thereby avoids destruction of the signals by the voice communications network.

In another aspect of the present invention, the signals are audio-frequency signals that include one or more audio tones, multi-frequency tones, or substantially Gaussian pulses generated by a multi-frequency controller. The Gaussian pulses are characterized by a $3\sigma$ (standard deviation×3) of between about 0.3 ms and 1 ms, and an amplitude of between −4 dBm and −10 dBm to avoid destructive attenuation by the voice communications network. Single or multi-frequency tones have a duration of between about 5 ms and 50 ms and a frequency in the range of about 300 to 3000 Hz. In a method using multiple tones or pulses per signal, the time of receipt of the tones or pulses (of a particular signal) may be averaged to improve accuracy of latency measurements and synchronization. The signals may also comprise a pulse train created by concatenating a plurality of tones or pulses spaced at regular and irregular intervals. Irregular spacing of tones or pulses facilitates accurate correlation of the reply signal to the reference signal at the reference station for calculation of the total round-trip time difference. Use of these techniques allows synchronization of the remote unit to within +/−500 $\mu$sec of the reference oscillator. In SPS-enabled remote units, use of the method of the present invention significantly reduces the time it takes the SPS receiver to attain SPS lock.

In still another aspect of the present invention, the signaling sequence is initiated by the remote unit, which generates and transmits the reference pulse, the receipt of which prompts the reference station to reply with a reply pulse after a reply delay interval. Latency calculations may then be performed at the remote unit. Synchronization of the remote unit still requires the remote unit to receive a synchronization signal transmitted by the reference station upon a time mark output of the reference oscillator.

The present invention presents particularly significant advantages in the context of a cellular telephone network in which the remote unit comprises a wireless communications device such as a cellular telephone. Unlike known wireless data communication devices, which transmit data and synchronization signals over a control or "overhead" channel of the communications network, the present invention requires no special equipment or software to be installed at a base station site of the wireless network for handling the reference, reply, and synchronization signals. By avoiding transmission over the control channel, the present invention lends itself to cost efficient implementation by avoiding modification of existing wireless and wire line (POTS) telephone network infrastructure. To the contrary, the present invention operates transparently over the existing infrastructure. "In-band" signals in the voice call path can be received at any point in the wireless or wire line networks, for to example at a location services controller or PSAP, which may also serve as a reference station. The present invention also provides advantages over prior-art wireless modem devices, which fully occupy the voice call path during data transmission by switching the wireless communications device to a data mode. By keeping the voice call path available to the wireless telephone user during latency measurement, synchronization, and location data transfer, the present invention facilitates substantially concurrent verbal communication between the wireless user and a call taker.

Many additional aspects and advantages of the present invention will be apparent from the following detailed description of preferred embodiments thereof which proceeds with reference to the accompanying drawings.

DETAILED DESCRIPTION OF PREFERRED EMBODIMENTS

Figure 2:
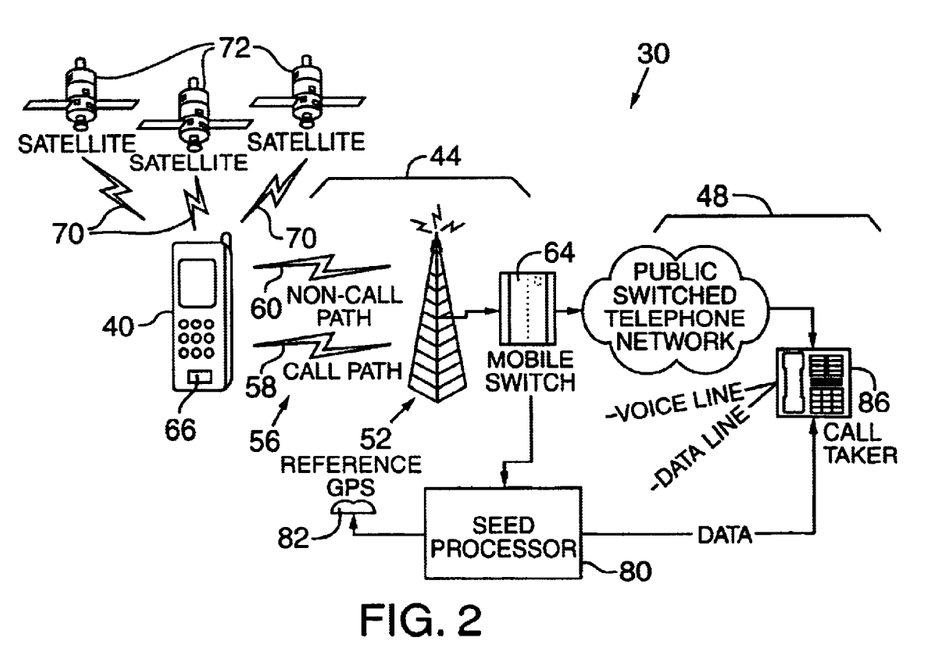
FIG. 2 is a diagram of a mobile unit including a SPS receiver in communication with a call taker over a wireless communications network for implementing a synchronization protocol in accordance with the present invention.

FIG. 2 shows a diagram of a voice communications network 30 including an SPS-enabled mobile unit 40 for implementing a first preferred embodiment of the present invention. With reference to FIG. 2, voice communications network 30 includes a wireless communications network 44 coupled to a public switched telephone network or ("POTS") 48. Wireless communications network 44 includes a base station 52 for transmitting radio frequency signals 56 to mobile unit 40 and for receiving radio frequency signals 56 from mobile unit 40. Radio frequency signals 56 include a voice channel signal 58 for transmitting audio, and a control channel signal 60 for transmitting control commands and digital data. A mobile switching center 64 couples wireless communication network 44 to POTS 48. Mobile unit 40 is preferably a cellular telephone handset, but may be any type of wireless communications device capable of transmitting over voice channel 58. Mobile unit 40 includes a local oscillator (also referred to as a "mobile oscillator" or a "remote oscillator") and an SPS receiver 66 for receiving SPS signals 70 that are broadcast by SPS satellites 72 in earth orbit and for calculating a location of the mobile unit based upon SPS signals 70. In normal operation, SPS receiver 66 achieves "lock" with SPS signals 70 to synchronize the local oscillator to within +/−10 microseconds ($\mu$sec). However, if SPS signals 70 are unavailable or SPS receiver 66 has not acquired an SPS signal, the local oscillator will not keep the correct SPS time due to drift of the local oscillator. In accordance with the present invention, resynchronization of the SPS oscillator may be initiated automatically by mobile unit 40, as necessary, or may occur during the next telephone call received or made by mobile unit 40.

To reduce the time required to resynchronize the local oscillator with SPS time, the local oscillator may be synchronized with a reference oscillator positioned at a known terrestrial location. This type of resynchronization procedure is known as "seeding" SPS receiver 66 because it results in synchronization to a wider tolerance than occurs during SPS lock. A seed processor 80 communicates with a reference SPS receiver 82 and the reference oscillator, which may be integrated with SPS receiver 82. Seed processor 80 may be coupled to wireless communications switch 64 or a call taking device 86 of POTS 48, or both. Once an audio call path has been established between seed processor 80 and mobile unit 40, seed processor 80 initiates a signaling sequence 100 (FIG. 3) to determine system latency and for synchronization of the local oscillator with the reference oscillator.

Figure 3:
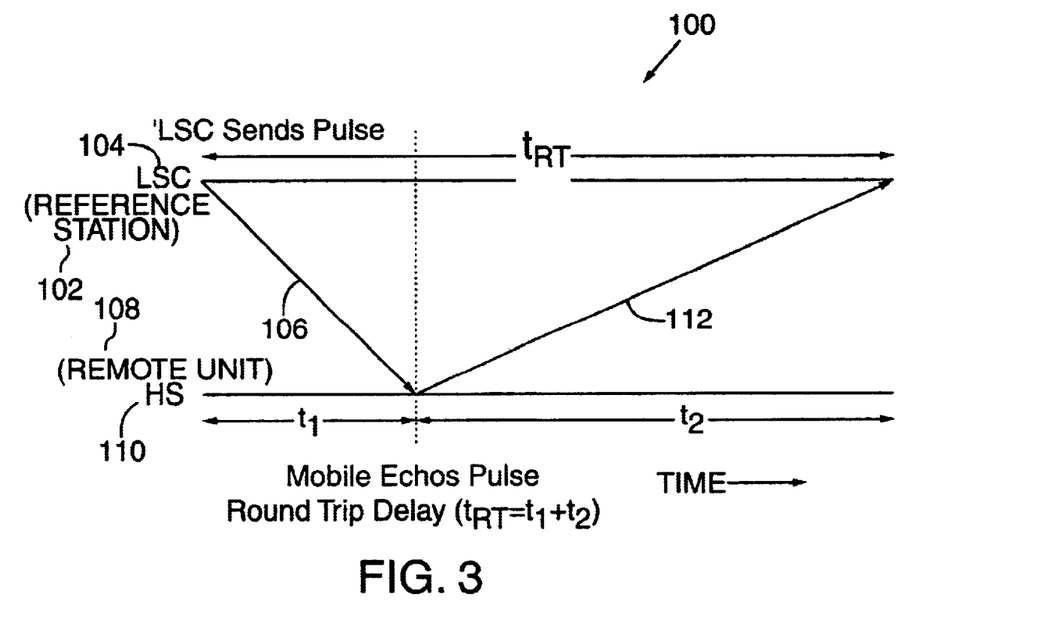
FIG. 3 is a diagram of a signal transmission sequence in accordance with the present invention.

FIG. 3 is a diagram of the signaling sequence 100 for measuring system latency. With reference to FIG. 3, a reference station 102 such as a location services controller (LSC) 104 transmits a reference signal over voice channel 58 (FIG. 2). A remote unit 108 such as a cellular telephone handset (HS) 110 receives reference signal 106 after a reference latency $t_1$. Remote unit 108 then responds to receipt of reference signal 106 by transmitting a reply signal 112, which is received at reference station 102 after a reply latency $t_2$. Reference latency $t_1$ and reply latency $t_2$ include both signal propagation time and time for processing the respective reference and reply signals 106, 112 at reference station 102 and remote unit 108. The elapsed time between the transmission of reference signal 106 and the receipt of reply signal 112 is measured at reference station 102 to determine a round-trip delay $t_{RT}$. If the reference latency $t_1$ and the reply latency $t_2$ are equal, the system is said to be symmetric. For purposes of illustration, asymmetry is exaggerated in FIG. 3. However, empirical measurements on CDMA, TDMA, GSM, and analog wireless phone systems, confirm that POTS network 48 in combination with wireless communications network 44 (FIG. 2) is symmetric (and substantially time-invariant during each call session) to within tolerances acceptable for the purpose of in-band signaling for time synchronization within +/−500 $\mu$sec. Because wireless and POTS communications networks are substantially symmetric, a one-way latency can be estimated as one-half the round-trip delay, or $\frac{1}{2} t_{RT}$.

Figure 4:
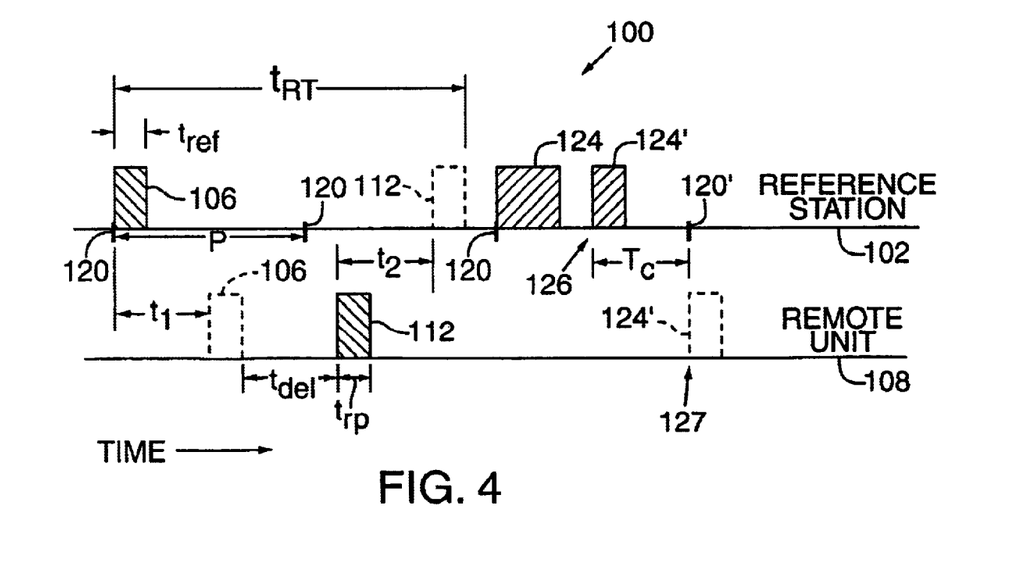
FIG. 4 is a timing diagram showing the timing and elements of a reference signal, a reply signal, and a synchronization signal of the signal transmission sequence of FIG. 3.

FIG. 4 is a timing diagram showing the timing and elements of signaling sequence 100. With reference to FIG. 4, the upper section of the timing diagram shows signals at reference station 102, and the lower section shows signals at remote unit 108. Transmitted signals are shown in solid lines, while received signals are shown in dashed lines. Signaling sequence 100 is shown in FIG. 4 as being initiated by reference station 102, but may be initiated in an alternative embodiment (not shown) at remote unit 108. To begin signaling sequence 100, reference station 102 transmits reference signal 106 having a reference duration $t_{ref}$. For convenience, reference signal 106 is transmitted by reference station 102 upon occurrence of a periodic time mark 120 of the reference oscillator having a period P. Reference signal 106 is received at remote unit 108 after reference latency $t_1$. Upon receipt of reference signal 106, remote unit 108 generates a reply signal 112 and transmits reply signal 112 after a preselected reply delay interval $t_{del}$. Reply signal 112 has a reply duration $t_{rp}$ and is received a reference station 102 after reply latency $t_2$. A measurement of round trip delay $t_{RT}$ is made at reference station 102. A total latency $T_L$ is then calculated as:

$$T_L = t_{RT} - (t_{ref} + t_{del} + t_{rp})$$

Because the communications network is substantially symmetric, a one-way latency of the system (estimated as ½$T_L$) can then be used as a correction interval $T_c$. A synchronization signal 124 representative of correction interval $T_c$ is transmitted from reference station 102. Synchronization signal 124 is transmitted upon the next time mark 120, and correction interval $T_c$ is transmitted as data to remote unit 108, either as part of synchronization signal 124 or as part of a separate data signal (not shown). Alternatively, synchronization signal 124' is transmitted at a correction time 126 in advance of a future time mark 120' by an amount equal to correction interval $T_c$. Remote unit 108 then utilizes correction interval $T_c$ and/or a time of receipt 127 of synchronization signal 124' to synchronize with the reference oscillator. Those skilled in the art will appreciate that synchronization can be accomplished in a variety of ways, based upon receipt at remote unit 108 of one or more signals representing correction interval $T_c$ and a time mark 120 of the reference oscillator. For example (not shown), synchronization signal 124 may be generated by forming a delayed time mark that is delayed by an amount equal to period P minus the correction interval $T_c$.

Voice communication networks and, particularly, digital cellular telephone networks use signal compression, spread-spectrum signal transmission, and other signal manipulation protocols to maximize call traffic in the signal transmission medium. These signal-processing protocols tend to remove signals in the call path that do not resemble human voice. To improve signal transmission through voice communications network 30 (FIG. 2) and to improve the accuracy of the latency measurements, reference signal 106, reply signal 112, and synchronization signal 124 are all generated as audio-frequency signals in the audio call path. Those skilled in the art will recognize that audio-frequency signals are converted numerous times between analog signal form, digital signal form, and radio frequency signal form during encoding, transmission, and decoding, as normally occurs in the audio call path of a wireless telephone network. The term "audio-frequency signals" as used herein describes any signal representative of audio as it travels in the call path, regardless of its form. Reference signal 106, reply signal 112, and synchronization signal 124 are generated to have characteristics that have been found empirically to pass through voice communications network 30.

Figure 5A:
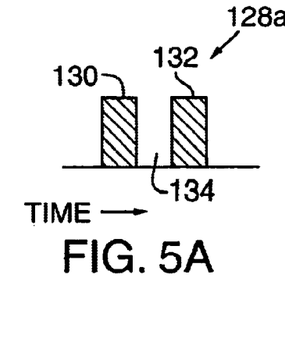
FIG. 5A is a diagram of a first alternative embodiment audio-frequency signal, comprising first and second reference tones.
Figure 5B:
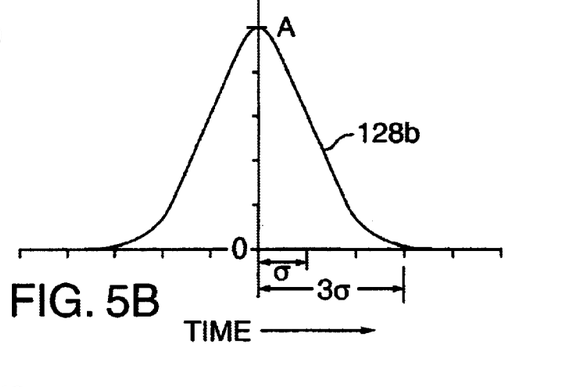
FIG. 5B is a diagram of a second alternative embodiment audio-frequency signal, comprising a Gaussian pulse.
Figure 5C:
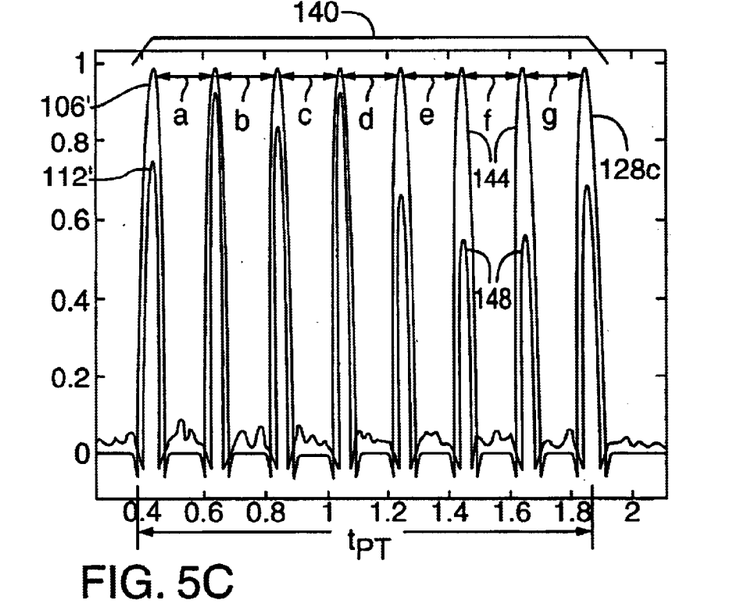
FIG. 5C is a diagram of a third alternative embodiment audio-frequency signal comprising a reference pulse train, overlaid with an observed reply pulse train.

FIGS. 5A, 5B, and 5C show respective first, second, and third alternative embodiments of an audio-frequency signal 128a, 128b, and 128c that may be used for reference signal 106, reply signal 112, and synchronization signal 124. With reference to FIG. 5A, a first alternative embodiment audio-frequency signal 128a includes a first audio-frequency tone 130 and a second audio-frequency tone 132 spaced apart in time by a reference pause 134. First and second audio-frequency tones 130, 132 are each characterized by a frequency of between 300 Hz and 3000 Hz, a predetermined duration of between 5 ms and 50 ms, and an amplitude of between −4 dBm and −10 dBm. Reference pause 134 is characterized by a preselected duration, which for convenience may be the same as the duration of first and second audio-frequency tones 130, 132, but may be selected to be shorter or longer. The use of multiple tones allows remote unit 108 and reference station 102 to average first and second audio-frequency tones 130, 132 as they are received and thereby more accurately determine the time at which audio-frequency signal 128a is received.

With reference to FIG. 5B, a second alternative embodiment audio-frequency signal 128b comprises a substantially Gaussian pulse represented as a function of time (t) by the equation:

$$G(t) = A \cdot e^{-1/2(t/\sigma)^2}$$

in which A is amplitude of between about −4 dBm and −10 dBm and a (standard deviation) is between about 100 μsec and 330 μsec. FIG. 5C shows a third alternative embodiment of reference signal 106', overlaid with a corresponding reply signal 112'. With reference to FIG. 5C, a third alternative embodiment audio-frequency signal 128c comprises a reference pulse train 140 including eight substantially Gaussian reference pulses 144 spaced at predefined intervals a, b, c, d, e, f, and g. Similarly, reply signal 112' (shown in FIG. 5C as received at reference station 102) comprises a reply pulse train including eight substantially Gaussian reply pulses 148 spaced substantially identical to reference pulses 144. Intervals a–g are irregular to enhance correlation at reference station 102 when determining round trip delay $t_{RT}$. By using irregular intervals a–g, correlation can be performed mathematically, even if not all of the Gaussian pulses 144, 148 are received. Those skilled in the art will recognize that the widths and intervals of reference pulses 144 may be selected so that only one of the reply pulses 148 need be received to correlate the pulse trains and determine total round trip delay $t_{RT}$, although less accurately than if more pulses are received. Preferably, third alternative embodiment audio-frequency signal 128c comprises an analog filtered pulse train modulated onto a voice-frequency carrier signal, with pulses 11.4 ms long with 3 dB bandwidth of 400 Hz and roll-off of 1.0. A total duration $t_{PT}$ of pulse train 140 is between about 143 ms and 189 ms. The voice-frequency carrier signal can be any signal in the voice frequency spectrum (300 Hz to 3000 Hz), but is preferably an 1800 Hz signal.

Figure 6:
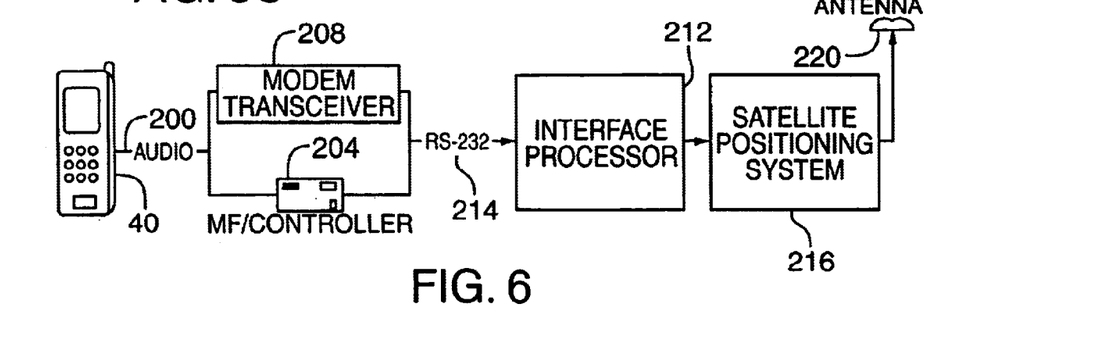
FIG. 6 is a schematic diagram of a mobile unit including a SPS receiver and a multi-frequency controller implementing the present invention.

FIG. 6 shows a schematic diagram of selected signal processing components of mobile unit 40. With reference to FIG. 6, mobile unit 40 includes an audio bridge 200 connected to a multi-frequency controller 204 and a modem transceiver 208. Multi-frequency controller 204 and modem transceiver 208 are connected to an interface processor 212 via, for example, an RS-232 connection 214. Interface processor 212 is connected to an SPS receiver 216 that includes an SPS antenna 220. Both multi-frequency controller 204 and modem transceiver 208 actively listen to the call path during signaling sequence 100. Ideally, the functions of multi-frequency controller 204, modem transceiver 208, interface processor 212, and SPS receiver 216 are integrated onto existing components of mobile unit 40, such as a CODEC, a digital signal processor (DSP), and an ARM microprocessor found in known cellular telephones. For prototype and testing purposes, multi-frequency controller 204 may be a personal computer including a sound card and running MATLAB software available from Mathworks, Inc., Natick, Mass., USA, or any other commercially available multi-frequency controller. To synchronize mobile unit 40 to within +/−500 μsec of the reference oscillator, interface processor 212 and multi-frequency controller 204 ideally operate so that the total root mean square error of the entirety of signaling sequence 100 is less than 0.1 ms. Reference station 102 (not shown) includes signal processing components that are similar to those of mobile unit, including a reference multi-frequency controller, a reference modem transceiver, and a reference interface processor.

It will be obvious to those having skill in the art that many changes may be made to the details of the above-described embodiments of this invention without departing from the underlying principles thereof. The scope of the present invention should, therefore, be determined only by the following claims.

What is claimed is:

1. In a voice communications network, a method for synchronizing a remote unit with a reference oscillator of a reference station, comprising:

establishing an audio call path between the reference station and the remote unit;

transmitting an audio-frequency reference signal from the reference station over the call path, the reference signal being transmitted for a predetermined reference duration;

receiving the reference signal at the remote unit;

generating an audio-frequency reply signal at the remote unit in response to the reference signal;

waiting a preselected reply delay interval beginning at an observed time of receipt of the reference signal;

transmitting the reply signal from the remote unit over the call path after waiting the reply delay interval, the reply signal being transmitted for a predetermined reply duration;

receiving the reply signal at the reference station;

measuring at the reference station a round-trip time difference between the transmission of the reference signal and an observed time of receipt of the reply signal;

calculating a total latency based on the round-trip time difference, the reference duration, the reply duration, and the reply delay interval;

selecting a synchronization reference time corresponding to a time mark output by the reference oscillator;

defining a correction time preceding the synchronization time by one-half the total latency;

transmitting a synchronization signal from the reference station over the call path at the correction time;

receiving the synchronization signal at the remote unit; and in the remote unit, synchronizing the remote unit with the reference oscillator in response to the synchronization signal.

2. The method of claim 1 in which:

the reference signal comprises first and second reference tones separated by a reference pause; and the reply signal comprises first and second reply tones separated by a reply pause.

3. The method of claim 2 in which the first and second reference tones are of equal duration, the first and second reply tones are of equal duration, and further comprising:

at the remote unit, averaging the observed times of receipt of the first and second reference tones and adjusting the observed time of receipt of the reference signal to thereby reduce errors inherent in the transmission and receiving of the reference signal; and at the reference station, averaging the observed times of receipt the first and second reply tones and adjusting the observed time of receipt of the reply signal to thereby reduce errors inherent in the transmission and receiving of the reply signal.

4. In a cellular telephone network, a method of synchronizing a mobile unit with a reference oscillator of a reference station, comprising:

establishing an audio call path between the mobile unit and the reference station;

transmitting an audio-frequency reference signal from the reference station over the audio call path, the reference signal having a predetermined reference duration;

receiving the reference signal at the mobile unit and generating an audio-frequency reply signal in response to the reference signal, the reply signal having a predetermined reply duration;

waiting a preselected reply delay interval beginning in response to receipt of the reference signal;

transmitting the reply signal from the mobile unit over the call path after waiting the reply delay interval;

receiving the reply signal at the reference station;

measuring at the reference station a round-trip time difference between the transmission of the reference signal and the receipt of the reply signal;

calculating a total latency based upon the round-trip time difference, the reference duration, the reply duration, and the reply delay interval;

selecting a synchronization reference time corresponding to a to a time mark output by the reference oscillator;

defining a correction time preceding the synchronization reference time by one-half the total latency;

transmitting a synchronization signal from the reference station over the call path at the correction time;

receiving the synchronization signal at the mobile unit; and in the mobile unit, synchronizing the mobile unit with the reference oscillator in response to the synchronization signal.

5. The method of claim 4 in which the reference and reply signals each includes a substantially Gaussian pulse.

6. The method of claim 5 in which each Gaussian pulse is characterized by a standard deviation of between 100 and 330 microseconds.

7. The method of claim 4 in which the reference and reply signals each has an amplitude of between −4 dBm and −10 dBm.

8. The method of claim 4 in which transmitting the reference signal includes repeating transmission of the reference signal until the reply signal is received by the reference station.

9. The method of claim 8 in which:

the call path has an anticipated maximum one-way propagation latency; and repeating the transmission of the reference signal includes repeating at repeat intervals that are greater than the anticipated maximum one-way propagation latency.

10. The method of claim 4 in which the reference and reply signals each includes a pulse train consisting of a series of audio-frequency pulses.

11. The method of claim 10 in which the audio-frequency pulses are irregularly spaced.

12. The method of claim 10 in which the audio-frequency pulses are modulated onto a voice frequency carrier signal.

13. The method of claim 10 in which the audio-frequency pulses are approximately 11.4 milliseconds in duration with a 3 dB bandwidth of 400 Hz and a roll-off of 1.0.

14. The method of claim 10 in which the pulse train has a total pulse train duration of between 143 milliseconds and 189 milliseconds.

15. In a voice communications network, a method for synchronizing a remote unit with a reference oscillator of a reference station, comprising:

establishing an audio call path between the reference station and the remote unit;

transmitting an audio-frequency reference signal from the reference station over the call path, the reference signal emulating human voice sounds to thereby avoid destructive attenuation of the reference signal by the voice communications network, the reference signal being transmitted for a predetermined reference duration;

receiving the reference signal at the remote unit;

generating an reply signal at the remote unit in response to the reference signal, the reply signal emulating human voice sounds to thereby avoid destructive attenuation of the reply signal by the voice communications network;

waiting a preselected reply delay interval beginning in response to receipt of the reference signal;

transmitting the reply signal from the remote unit over the call path after waiting the reply delay interval, the reply signal being transmitted for a predetermined reply duration;

receiving the reply signal at the reference station;

measuring at the reference station a round-trip time difference between the transmission of the reference signal and the receipt of the reply signal;

calculating a total latency based on the round-trip time difference, the reference duration, the reply duration, and the reply delay interval;

calculating a correction interval equal to one-half the total latency;

transmitting a synchronization signal from the reference station over the call path, the synchronization signal representative of the correction interval;

receiving the synchronization signal at the remote unit; and in the remote unit, synchronizing the remote unit with the reference oscillator in response to the synchronization signal.

16. The method of claim 15 in which the reference signal and the reply signal each includes a substantially Gaussian pulse characterized by a standard deviation (σ) of between 100 microseconds and 330 microseconds.

17. The method of claim 15 in which the reference and reply signals each has an amplitude of between −4 dBm and −10 dBm.

18. The method of claim 15, further comprising:

generating an audio-frequency synchronization reference signal corresponding to a reference time mark output by the reference oscillator and occurring after receipt of the reply signal;

transmitting the audio-frequency synchronization reference signal from the reference station over the call path upon the output of the reference time mark.

19. The method of claim 15, further comprising determining a correction time preceding a synchronization time of the reference oscillator, and in which transmitting the synchronization signal includes an transmitting an audio-frequency synchronization correction signal from the reference station over the call path at the synchronization time.

20. The method of claim 15, further comprising determining a correction time preceding a reference time mark output from the reference oscillator, the correction time preceding the reference time mark by an amount equal to the correction interval; and in which the synchronization signal is representative of the correction time.

21. In a telephone network including a reference station positioned at a known terrestrial location and a mobile cellular telephone unit in communication with the reference station, an improved method of synchronizing a mobile oscillator of the mobile cellular telephone unit with an SPS oscillator of an SPS satellite system, comprising:

synchronizing a reference oscillator of the reference station with the SPS oscillator;

establishing an audio call path between the reference station and the mobile cellular telephone unit;

transmitting from the reference station an audio-frequency reference signal over the call path, the reference signal being transmitted for a predetermined reference duration;

receiving the reference signal at the mobile cellular telephone unit;

generating at the mobile cellular telephone unit in response to the reference signal, an audio-frequency reply signal;

transmitting from the mobile cellular telephone unit the reply signal over the call path at a reply time, the reply time occurring after a predetermined reply delay interval following receipt of the reference signal by the mobile cellular telephone unit, the reply signal being transmitted for a predetermined reply duration;

receiving the reply signal at the reference station;

measuring at the reference station a round-trip time difference between the transmission of the reference signal and the receipt of the reply signal;

calculating a total latency based on the round-trip time difference, the reference duration, the reply duration, and the reply delay interval;

transmitting from the reference station over the call path a synchronization signal at a correction time, the correction time being subsequent to the synchronization of the reference oscillator with the SPS oscillator and preceding a synchronization reference time by a correction interval, the correction interval equal to one-half the total latency;

receiving the synchronization signal at the mobile unit; and adjusting the mobile oscillator in response to the synchronization signal and thereby synchronizing the mobile oscillator with the SPS oscillator.

22. A method of synchronizing a mobile wireless communications device having a local clock, comprising the steps of:

establishing a voice call connection between the mobile device and the reference station;

determining a specific time correction factor as between the reference station and the mobile device over the established voice call connection;

in the reference station, maintaining a current Satellite Positioning System (SPS) time and generating a periodic SPS time mark signal associated with the current SPS time;

transmitting data reflecting the current SPS time from the reference station to the mobile device over the established voice call connection encoded as audio frequency signals;

forming a delayed SPS time mark by delaying the periodic SPS time mark by the time correction factor;

transmitting the delayed SPS time mark from the reference station to the mobile device; and in the mobile device, synchronizing the local clock to the current SPS time responsive to the delayed SPS time mark thereby synchronizing the local clock to the SPS time maintained by the reference station.

23. The method of claim 22 wherein said determining a specific time correction factor includes determining a total latency time for transmission of signals between the reference station and the mobile device over the established voice call connection.

24. The method of claim 22 wherein determining the total latency time includes:
   transmitting an audio frequency reference signal from the reference station to the mobile device over the established voice call connection;
   transmitting a reply signal from the mobile device to the reference station over the established voice call connection in response to the reference signal; and
   measuring a latency time between said transmission of the reference signal and receipt of the reply signal at the reference station.

25. The method of claim 23 wherein the time correction factor is calculated as one-half of the total latency time.

26. A method of synchronizing a mobile wireless communications device having a local clock, comprising the steps of:
   establishing a voice call connection between the mobile device and a reference station;
   determining a specific time correction factor as between the reference station and the mobile device over the established voice call connection;
   in the reference station, maintaining a current Satellite Positioning System (SPS) time and generating a periodic SPS time mark signal associated with the current SPS time;
   transmitting data reflecting the current SPS time from the reference station to the mobile device over the established voice call connection encoded as audio frequency signals;
   transmitting the SPS time mark signal from the reference station to the mobile device;
   in the mobile device, forming a delayed SPS time mark signal by delaying the received SPS time mark by the time correction factor; and then synchronizing the local clock to the current SPS time responsive to the delayed SPS time mark thereby synchronizing the local clock to the SPS time maintained by the reference station.

27. The method of claim 26 wherein said determining a specific time correction factor includes determining a total latency time for round trip transmission of signals between the reference station and the mobile device over the established voice call connection.

28. The method of claim 27 wherein determining the total latency time includes:
   transmitting an audio frequency reference signal from the reference station to the mobile device over the established voice call connection;
   transmitting a reply signal from the mobile device to the reference station over the established voice call connection in response to the reference signal; and
   measuring a latency time between said transmission of the reference signal and receipt of the reply signal at the reference station.

29. A method according to claim 27 wherein the time correction factor is calculated as one-half of the total latency time.

30. The method of claim 26 wherein said determining a specific time correction factor includes:
   transmitting an audio frequency reference signal from the mobile device to the reference station over the established voice call connection;
   transmitting a reply signal from the reference station to the mobile device over the established voice call connection in response to the reference signal; and
   measuring a latency time between said transmission of the reference signal and receipt of the reply signal at the mobile station.

31. A satellite positioning system (SPS)-enabled mobile unit having a local SPS time clock and configured for assisted synchronization, the mobile unit comprising:
   an SPS antenna for receiving SPS signals from orbiting SPS satellites;
   an SPS receiver coupled to the SPS antenna for receiving the SPS signals to form SPS raw data and for maintaining the local SPS time clock;
   a microprocessor coupled to the SPS receiver and including software for processing the raw SPS data to form location data and for synchronizing the local SPS time clock;
   a multi-frequency controller coupled to the microprocessor for generating multi-frequency audio tones to encode the location data and for decoding received multi-frequency audio tones to form synchronization data;
   a wireless communications transceiver operable for sending and receiving voice communications over a call path of a wireless communications network, the wireless communications transceiver including an audio port coupled to the multi-frequency controller for sending the encoded location data over the call path and for receiving and decoding synchronization data received as audio-frequency tones over the call path;
   the software for synchronizing the local SPS time clock operable to adjust the local SPS time clock in response to the synchronization data received by the wireless communications transceiver over the call path and decoded by the multi-frequency controller.

32. The mobile unit of claim 31 wherein the multi-frequency controller is implemented in software executable on the microprocessor.

33. The mobile unit of claim 31 wherein the software for synchronizing the local SPS time clock is responsive to synchronization data received over the call path that includes a correction time for synchronizing the SPS local time clock, the correction time corresponding to a difference between the local SPS time and an actual SPS time as provided by the orbiting SPS satellites.

* * * * *